Feb. 24, 1970   E. G. ADAMS ET AL   3,497,167
EXTENDABLE, ROTATABLE SUPPORT FOR AIRCRAFT
Filed July 27, 1967   3 Sheets-Sheet 1
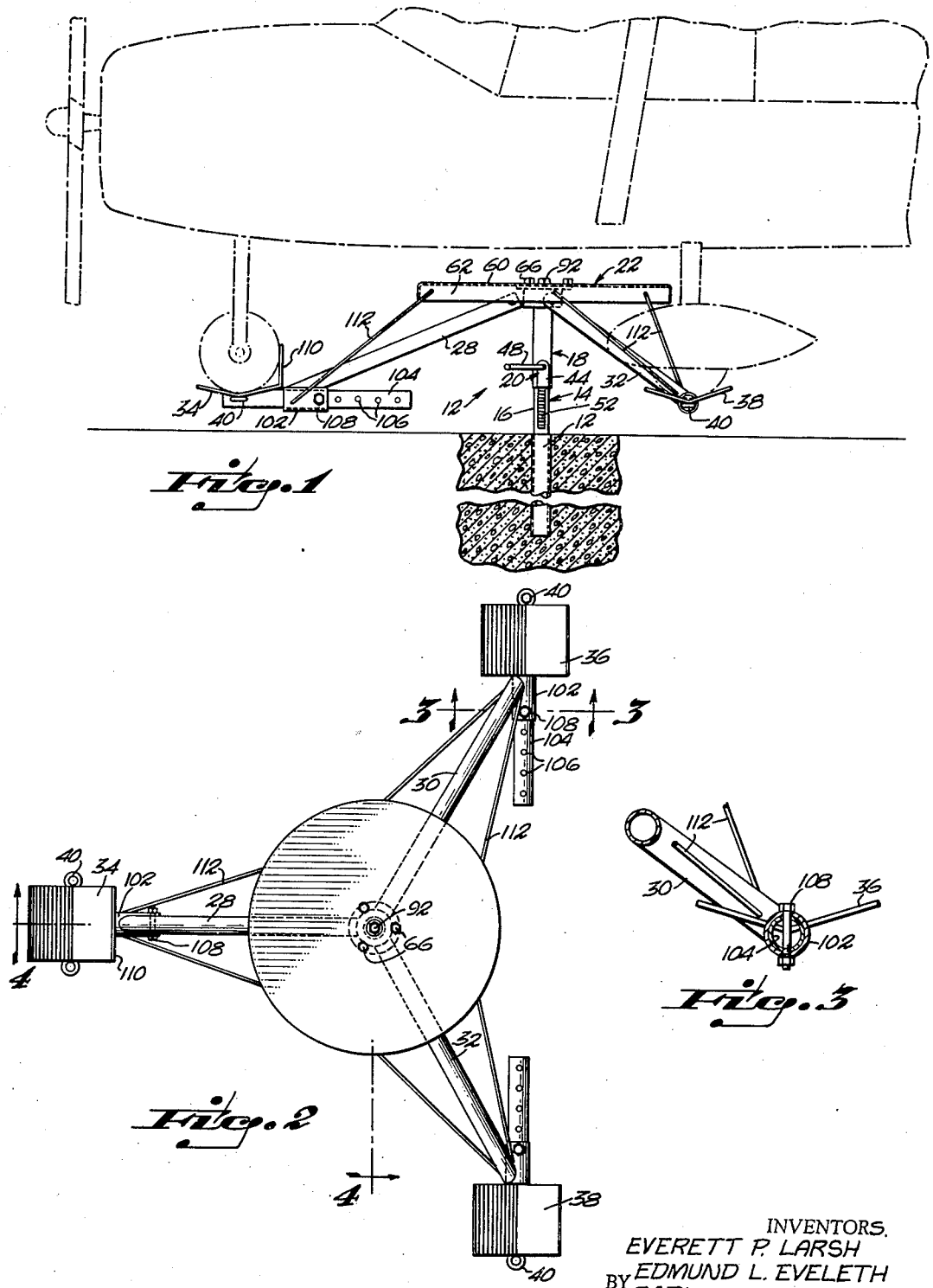
INVENTORS.
EVERETT P. LARSH
EDMUND L. EVELETH
EARL G. ADAMS
BY
ATTORNEY

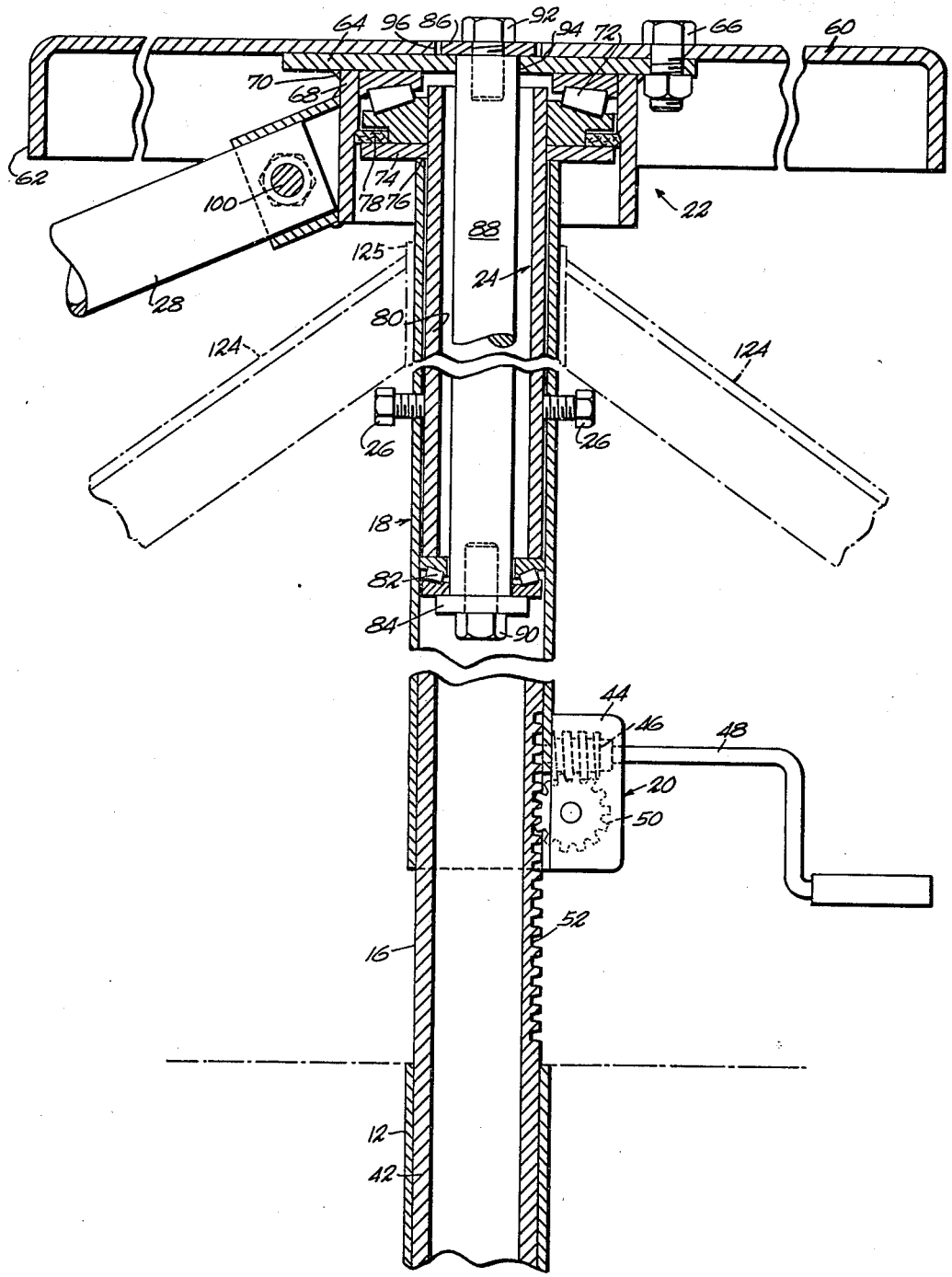

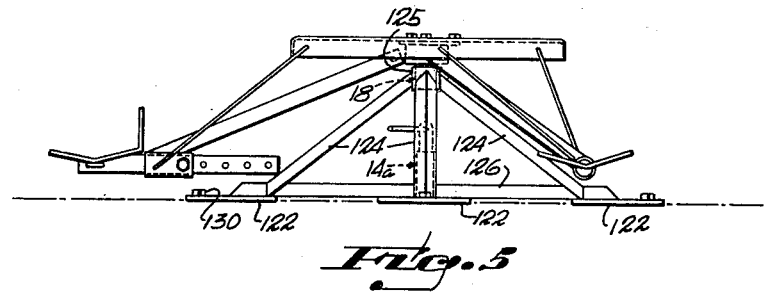
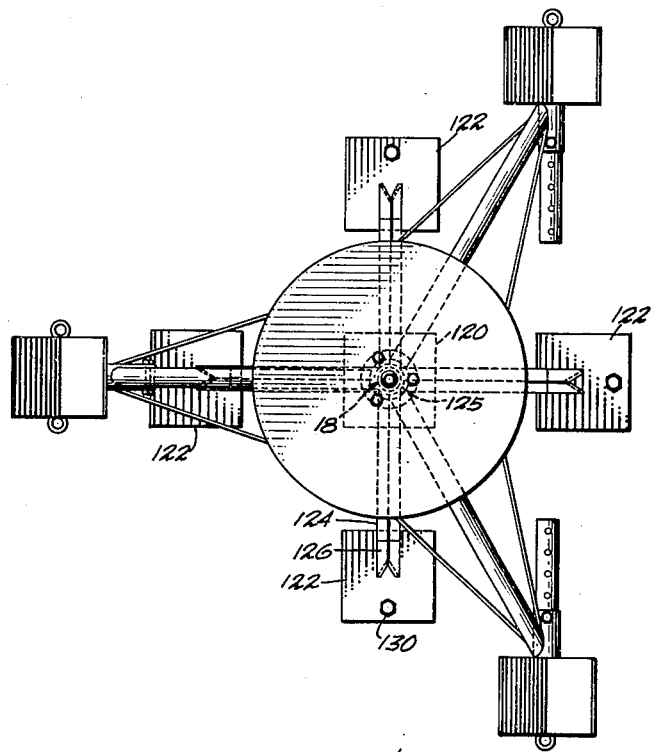

United States Patent Office 3,497,167
Patented Feb. 24, 1970

3,497,167
EXTENDABLE, ROTATABLE SUPPORT FOR AIRCRAFT
Earl G. Adams, 2130 NW. 13th St. 33125, and Edmund L. Eveleth, 10901 SW. 180th St. 33157, both of Miami, Fla.; and Everett P. Larsh, Miami Beach, Fla.; said Larsh assignor to said Adams and said Eveleth
Filed July 27, 1967, Ser. No. 656,533
Int. Cl. B64f 1/12
U.S. Cl. 244—115        11 Claims

ABSTRACT OF THE DISCLOSURE

An extendable, rotatable parking support for aircraft having a base structure rigidly anchored in concrete as to the ground, and an aircraft carriage assembly rotatably carried thereby. Cradle means to nest each unit of a conventional aircraft landing gear are provided on the rotatable aircraft carriage assembly along with means to enable the aircraft to be securely lashed thereto. A jack means is provided in the standard supported by the base structure to provide for raising or lowering of the rotatable aircraft carriage assembly relative to the ground level. In operation the rotatable carriage assembly is lowered to position the wheel cradles at ground level to permit an aircraft to be positioned thereon, and said carriage assembly is then elevated to raise the cradles supporting the aircraft landing gear a distance in the order of three inches to permit the aircraft to weathercock or maintain a natural flight attitude at all times under influence of the prevailing wind conditions.

---

This invention pertains to an extendible, rotatable support for aircraft and is more particularly directed to an aircraft parking device which rotates in such a manner, when an airplane is positioned thereon, to permit the airplane to weathercock into its natural flight position.

As is well known, aircraft, when parked in exposed areas, are subject to wind damage or complete destruction from high winds such as those accompanying summer thunderstorms, squalls, gales, hurricanes or the like. While some types of windstorms are known in advance to be approaching, others may arise quite suddenly and unexpectedly and cause very considerable damage to parked aircraft, especially when the winds are in a direction so as to hit the aircraft broadside.

With storms such as hurricanes, which are known to be approaching, it is now common practice to bury the aircraft wheels deep and to secure the wings and tail to anchors with strong lines. The effectiveness of this type of tiedown is limited with a 360° directional storm, however, because high winds, varying in direction to all quadrants, against a trussed-down airplane usually result in some hull damage because the control surfaces such as the rudder, elevator and ailerons are subjected to severe, unnatural forces.

It is, therefore, a principal object of the instant invention to provide an extendible, rotatable parking support for aircraft which will permit the aircraft to rotate therewith through 360° so that it is always facing into the wind when exposed to strong wind forces.

It is a further object of the invention to provide an extendible, rotatable parking support for aircraft which may be either portable or secured in a fixed position in the ground or to a concrete ramp or apron.

A still further object of the invention is to provide a jack means for the aircraft parking support whereby it is lowered to permit the aircraft to be easily positioned thereon, either under its own power or by other appropriate means, and then elevated a distance, in the order of approximately three inches, to permit rotation thereof under influence of the prevailing winds.

Another object of the invention is to provide suitable cradle means for the landing gear which are preferably adjustable to accommodate aircraft with varying spans between the landing gear wheels.

Yet another object of the instant invention is to provide means for permitting the aircraft to be tightly secured to the extendible, rotatable support.

In accordance with these and numerous other objects and advantages which will become more fully apparent hereinafter, the instant invention will now be described with reference to the accompanying drawings.

In the drawings:

FIGURE 1 is a side-elevational view of an extendible, rotatable parking support for aircraft in accordance with the instant invention and illustrating an aircraft, shown in phantom, thereon;

FIGURE 2 is a top plan view of the extendible, rotatable parking support;

FIGURE 3 is a cross-sectional view taken along the line 3—3 of FIGURE 2 and looking in the direction of the arrows;

FIGURE 4 is an enlarged vertical sectional view taken along the line 4—4 of FIGURE 2 and looking in the direction of the arrows;

FIGURE 5 is a side-elevational view, similar to FIGURE 1, illustrating a modified form or portable, extendible, rotatable aircraft parking support of the instant invention;

FIGURE 6 is a top plane view of the modified support of support of FIGURE 5.

In the drawings wherein like reference numerals designate like or similar parts throughout the various views, 12 indicates generally a tubular anchor or base support for an extendible standard 14 which includes a lower tubular member 16 supported therein and extending upwardly therefrom and an upper tubular member 18 in telescopic engagement therewith. A suitable jack means indicated generally at 20 is included in the extendible standard to provide for up and down vertical translation of the upper tubular telescopic member 18 relative to the lower tubular member 16.

A rotatable aircraft carriage assembly indicated generally at 22 is journaled in the upper end of the upper tubular member 18 on a suitable anti-friction bearing assembly 24 which is fixed in said tubular member 18 by means of set screws 26. Outwardly and downwardly spaced radially extending legs 28, 30 and 32 are fixed to the carriage assembly 22 and each leg is provided with a landing gear wheel cradle 34, 36 and 38 fixed thereto at its outer extremity. Tiedown rings or eyes 40 are welded to each of the cradles to enable the aircraft to be securely lashed thereto.

In more detail and referring to the preferred form of the instant invention as illustrated in FIGURES 1 through 4, the tubular anchor support 12 is firmly embedded in concrete a depth in the order of approximately three feet to insure stability of the extendible, rotatable aircraft support carried therein. The lower end 42 of the lower tubular member 16 of the standard 14 is sized to be received within the anchor support 12 and extends to the bottom thereof. The upper tubular member 18 of standard 14 is telescopically engaged over the lower tubular member 16 and includes the jack assembly 20 fixed thereto adjacent its lower distal end, which jack assembly as illustrated provides a housing 44 enclosing a worm gear 46 fixed to the inner end of a handle 48 projecting outwardly therefrom. The worm gear 46 operably engages a worm wheel 50 which in turn engages a gear rack portion 52 of the lower tubular member 16. The jack assembly as shown and described is purely illustrative as any type of manual, hydraulic or pneumatic jack means may be employed.

As best illustrated in FIGURE 4, the rotatable carriage assembly 22 includes an annular platform 60 providing a downwardly extending skirt portion 62 at its outer periphery, and a disk member 64 concentric therewith and fixed to the underside thereof by means of bolts 66. A reduced diameter tubular skirt 68 concentric with the annular platform 60 and disk 64 is fixed as by welding 70 to the underside of said disk and extends downwardly to enclose the top thrust bearing 72 of the bearing assembly 24, as well as a bearing retainer ring 74 engaged between the lower race of bearing 72 and the upper distal end 76 of the upper tubular member 18. A felt packing gland 78 is disposed between the retainer ring 74 and the bearing 72.

Extending through and downwardly from the upper bearing 72 and retainer ring 74, a tubular bearing spacer member 80 interior of and concentric with tubular member 18 engages the top race of a bottom thrust bearing 82 of the bearing assembly 24, said thrust bearing being held in place against the bottom distal end of said spacer member by a pair of retainer rings 84 and 86 bolted as at 90 and 92 to opposite ends of a shaft 88 extending axially through the standard 14 and tubular member 80. The lower retainer ring 84 abuts the bottom race of the bearing 82 and the shaft 88 extends axially upwardly therefrom and projects through a central aperture 94 in the disk 64 and carries the retainer ring 86 in overlying relation to the top face of disk 64. A central aperture 96 is provided in the platform 60 to accommodate the retainer ring 86.

As previously stated the rotatable carriage assembly 22 including the bearing assembly 24 is fixed to the upper tubular standard member 18 by means of a plurality of set screws 26 threaded through said member 18 into engagement with the concentric tubular member 80 of the bearing assembly and is therefore held in assembly therewith and free to rotate relative thereto.

Although the structure as illustrated is readily adaptable to the conventional landing gear composed of a pair of main landing wheels and a tail wheel, the device as illustrated is designed to accommodate aircraft with a tri-cycle type of landing gear. The cradle 34 carried by leg 28 is provided to accommodate the nose wheel and the cradles 36 and 38 carried by legs 30 and 32 accommodate the main pair of landing wheels.

The outwardly and downwardly radially extending legs 28, 30 and 32 are fixed as by bolts 100 in appropriately spaced tubular receptacles fixed as by welding to the outer annular face of the bearing enclosing skirt 68.

As best illustrated in FIGURES 1 and 2 the cradles are preferably adjustable to accommodate aircraft with varying spans between the landing gear wheels. This is accomplished by fixing a sleeve 102 as by welding to the outer distal end of each leg to be interiorly traversed by a tube 104 provided with a plurality of positioning holes 106 to be selectively engaged by a lock bolt 108 carried by the sleeve 102. The outer distal end of each tube 104 has a cradle 34, 36 and 38 fixed as by welding thereto, the cradles preferably being of a shallow V configuration to nest the wheels therein. With the tri-cycle type of landing gear it is necessary to back the aircraft onto the cradles and an upstanding back wall 110 is therefore provided as a stop on at least one of the cradles, as illustrated on the nose wheel cradle 34 in the drawings.

Each of the cradles is also provided with one or more tiedown rings or eyes 40 to facilitate securely lashing the aircraft thereto when it is in position thereon.

Diagonal stabilizing struts 112 are preferably provided for each leg with the outer distal end of each strut being fixed as by welding to a sleeve 102 and the inner distal end of each strut so fixed to the skirt 62 of the platform 60. In the preferred structure two such struts or stays, one on each side thereof, are provided for each leg.

In the modified form of the instant invention illustrated in FIGURES 5 and 6, the extendible, rotatable support for aircraft is generally of the same construction as described with the exception that the standard 14a is shortened and provided with an enlarged foot or base plate 120 fixed thereto as by welding, which foot is coplanar with a plurality of similar base plates or feet 122 fixed as by welding to the intersection of the outer distal ends of outwardly and downwardly, radially extending stanchions 124 and horizontal cross-brace members 126. Stanchions 124 are fixed as by welding at their upper inner ends to a collar 125 slidingly captivated about the upper tubular standard member 18. Each base plate is provided with at least one hole to receive a bolt 130 to hold the structure rigidly in place on a concrete ramp or the like. When it is necessary to hold the support in place on the ground, long headed rods are driven deep into the ground until the heads contact the top surfaces of the base plates.

While the instant invention has been shown and described herein in what is conceived to be the most practical and preferred embodiment, it is recognized that departures may be made therefrom within the scope of the invention, which is therefore not to be limited to the details disclosed herein.

What is claimed is:
1. An extendible rotatable parking support for an aircraft having tricycle landing gear and adapted for attachment to a support area, said support comprising, in combination;
 an extendible vertical standard including a tubular support base with means for rigid securement in a fixed position to said area;
 upper inner and lower outer tubular members in telescopic relation slidably received in said tubular base in substantially vertical relation;
 an aircraft carriage assembly;
 anti-friction means to interconnect said carriage assembly to the upper end of said standard for rotation of said carriage assembly through 360 degrees about said standard;
 three wheel receiving members supported by said carriage assembly and lying in a common plane substantially perpendicular to the axis of rotation of said carriage assembly to receive respectively one unit each of the landing gear wheels of an aircraft having tricycle landing gear; and
 lift means interconnecting said telescoping upper and lower tubular members to extend said standard and lift said wheel receiving members for rotation of aircraft supported thereby about the standard to weathercock in response to wind forces.

2. The device as set forth in claim 1 wherein said wheel receiving members comprise cradle means distally arranged on radially extending arms depending from said assembly and include holding means to interengage the aircraft landing gear to hold the same securely to said assembly.

3. The device as set forth in claim 2 wherein each of said arms includes a horizontally arranged sleeve member on the distal ends thereof and each of said wheel receiving members includes a tubular portion sized for horizontal movement of translation within said sleeve member for lateral adjustment of said wheel receiving members relative to said standard; and adjustable holding means interconnecting said sleeve and said tubular portion to lock said wheel receiving members in adjusted relation with respect to said standard.

4. The device as set forth in claim 3 wherein said adjustable holding means comprises a series of diametrical cross bores spaced in a common plane along the length of said tubular member; a diametrical bore extending through said sleeve member and a lock bolt adapted to pass through said diametrical bores to selectively secure the wheel receiving members in any one of a plurality of positions with respect to the distal end of said arm.

5. The device as set forth in claim 1 wherein reinforcing means are provided to interconnect the wheel receiving members and the assembly.

6. The device as set forth in claim 1 wherein adjustment means are provided on said assembly to move said wheel receiving members radially with respect to the axis of the standard.

7. The device as set forth in claim 1 wherein said wheel receiving members are configured to nestle the wheels of an aircraft landing gear therein.

8. The device as set forth in claim 3 wherein reinforcement means are provided to interconnect the wheel receiving members and said assembly and include struts connected to said assembly.

9. The device as set forth in claim 1 wherein said anchor base includes a base plate means to overlay a substantial portion of the support area and a plurality of reinforcing means interconnecting the base plate means and said tubular members.

10. The device as set forth in claim 1 wherein said base plate means includes a plurality of vertical members to secure the base plate means to the support area.

11. The device as set forth in claim 1 wherein said anchor base includes a tubular base vertically arranged in said support area and anchored securely therein, said upper and lower tubular members being secured in said base.

References Cited

UNITED STATES PATENTS 2,483,078   9/1949   Williams _____ 244—115

FOREIGN PATENTS 736,557   6/1943   Germany.

OTHER REFERENCES

Popular Mechanics, vol. 114, No. 5, November 1960, p. 157, "Roundhouse" in Hangar Rotates Airplane.

MILTON BUCHLER, Primary Examiner

PAUL E. SAUBERER, Assistant Examiner